United States Patent
Asai et al.

(10) Patent No.: US 10,857,943 B2
(45) Date of Patent: Dec. 8, 2020

(54) VEHICLE SURROUNDINGS DISPLAY DEVICE

(71) Applicant: TOYOTA JIDOSHA KABUSHIKI KAISHA, Toyota (JP)

(72) Inventors: Goro Asai, Toyota (JP); Kunihiro Sugihara, Nagakute (JP); Tomoaki Iida, Okazaki (JP); Yuki Takahashi, Toyota (JP); Taichi Hasegawa, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/549,512

(22) Filed: Aug. 23, 2019

(65) Prior Publication Data
US 2020/0070723 A1 Mar. 5, 2020

(30) Foreign Application Priority Data
Sep. 5, 2018 (JP) .................. 2018-166118

(51) Int. Cl.
*B60R 1/00* (2006.01)
*G06K 9/00* (2006.01)
(Continued)

(52) U.S. Cl.
CPC ............ *B60R 1/00* (2013.01); *G06K 9/00805* (2013.01); *G06T 3/40* (2013.01); *H04N 7/181* (2013.01);
(Continued)

(58) Field of Classification Search
CPC ................ B60R 1/00; B60R 2300/105; B60R 2300/306; B60R 2300/8026;
(Continued)

(56) References Cited

U.S. PATENT DOCUMENTS

| 8,423,903 B2 | 4/2013 | Pearce |
| 8,665,331 B2 | 3/2014 | Onaka |

(Continued)

FOREIGN PATENT DOCUMENTS

| DE | 10 2016 112 817 A1 | 1/2017 |
| EP | 3 176 035 A1 | 6/2017 |

(Continued)

OTHER PUBLICATIONS

Office Action dated Feb. 4, 2020 in U.S. Appl. No. 16/407,474.
(Continued)

*Primary Examiner* — Farzana Hossain
(74) *Attorney, Agent, or Firm* — Sughrue Mion, PLLC

(57) ABSTRACT

A vehicle surroundings display device is provided. The vehicle surroundings display device includes an imaging device, a display device, and a display controller. The imaging device images a region toward a rear side of a vehicle and sideways from the vehicle. The display device is capable of displaying an image captured by the imaging device. The display controller displays a first predetermined area of the image as a first display image on the display device in cases in which a direction indicator of the vehicle is in an inactive state, displays a second predetermined area of the image corresponding to an activated side of the direction indicator as a second display image on the display device in cases in which the direction indicator has transitioned from an inactive state to an active state, the second predetermined area being wider than the first predetermined area and including the first predetermined area, and switches a display on the display device from the second display image to the first display image after a predetermined standby duration has elapsed when the direction indicator has transitioned from an active state to an inactive state.

8 Claims, 11 Drawing Sheets

(51) Int. Cl.
*H04N 7/18* (2006.01)
*G06T 3/40* (2006.01)

(52) U.S. Cl.
CPC . *B60R 2300/105* (2013.01); *B60R 2300/8026* (2013.01); *B60R 2300/8066* (2013.01)

(58) Field of Classification Search
CPC .... B60R 2300/8046; B60R 2300/8066; G06K 9/00805; G06T 3/40; H04N 7/181
See application file for complete search history.

(56) References Cited

U.S. PATENT DOCUMENTS

| | | | |
|---|---|---|---|
| 8,717,196 | B2 | 5/2014 | Wang et al. |
| 9,930,296 | B2 | 3/2018 | Aoki et al. |
| 9,963,071 | B2 | 5/2018 | Asai |
| 10,019,965 | B2 | 7/2018 | Segawa |
| 10,131,277 | B2 | 11/2018 | Watanabe |
| 10,183,621 | B2 | 1/2019 | Hodohara |
| 10,306,137 | B2 | 5/2019 | Takahashi |
| 10,315,569 | B2 | 6/2019 | Watanabe et al. |
| 10,363,876 | B2 | 7/2019 | Onaka |
| 10,647,260 | B2 | 5/2020 | Lida et al. |
| 2005/0174429 | A1 | 8/2005 | Yanai |
| 2005/0180858 | A1 | 8/2005 | Halgas, Jr. |
| 2007/0035625 | A9 | 2/2007 | Hamdan et al. |
| 2010/0194596 | A1 | 8/2010 | Wang et al. |
| 2011/0149077 | A1 | 6/2011 | Robert |
| 2011/0317014 | A1 | 12/2011 | Onaka |
| 2012/0033123 | A1* | 2/2012 | Inoue ................... G08G 1/04 348/333.13 |
| 2012/0154591 | A1* | 6/2012 | Baur ..................... B60R 1/00 348/148 |
| 2012/0169875 | A1 | 7/2012 | Matsukawa et al. |
| 2012/0274737 | A1 | 11/2012 | Kuboyama et al. |
| 2013/0093889 | A1 | 4/2013 | Headley et al. |
| 2013/0293683 | A1 | 11/2013 | Zhou et al. |
| 2014/0132527 | A1 | 5/2014 | Wu |
| 2014/0300740 | A1 | 10/2014 | Fujioka |
| 2014/0313359 | A1 | 10/2014 | Hwang et al. |
| 2015/0191118 | A1 | 7/2015 | Matsukawa et al. |
| 2015/0197197 | A1 | 7/2015 | Watanabe et al. |
| 2016/0019794 | A1 | 1/2016 | Dominic et al. |
| 2016/0114727 | A1 | 4/2016 | Watanabe |
| 2016/0129837 | A1 | 5/2016 | Zhu |
| 2016/0142685 | A1 | 5/2016 | Aoki et al. |
| 2016/0185292 | A1 | 6/2016 | Asai |
| 2016/0191794 | A1 | 6/2016 | Varonos |
| 2016/0227123 | A1 | 8/2016 | Nagase et al. |
| 2016/0231977 | A1* | 8/2016 | Yamada ............... G06F 3/0488 |
| 2017/0028921 | A1 | 2/2017 | Asai |
| 2017/0082583 | A1 | 3/2017 | Tarafder |
| 2017/0082853 | A1 | 3/2017 | Yoshimoto |
| 2017/0094189 | A1 | 3/2017 | Ogawa |
| 2017/0099430 | A1 | 4/2017 | Fukui et al. |
| 2017/0161566 | A1 | 6/2017 | Sung et al. |
| 2017/0232898 | A1 | 8/2017 | Maejima et al. |
| 2017/0249923 | A1 | 8/2017 | Segawa |
| 2017/0297496 | A1 | 10/2017 | Onaka |
| 2017/0371156 | A1 | 12/2017 | Heishi et al. |
| 2018/0152674 | A1 | 5/2018 | Aoki |
| 2018/0183996 | A1 | 6/2018 | Takahashi |
| 2018/0222489 | A1 | 8/2018 | Boran et al. |
| 2018/0262687 | A1 | 9/2018 | Hildreth |
| 2018/0345790 | A1 | 12/2018 | Mimura et al. |
| 2018/0345988 | A1 | 12/2018 | Mimura et al. |
| 2018/0345991 | A1 | 12/2018 | Mimura et al. |
| 2018/0348758 | A1 | 12/2018 | Nakamura et al. |
| 2018/0373250 | A1 | 12/2018 | Nakamura et al. |
| 2019/0052843 | A1 | 2/2019 | Izumi et al. |
| 2019/0071015 | A1 | 3/2019 | Inagaki et al. |
| 2019/0135191 | A1 | 5/2019 | Sunagawa et al. |
| 2019/0161624 | A1 | 5/2019 | Moriguchi et al. |
| 2019/0236343 | A1 | 8/2019 | Konishi |
| 2019/0347490 | A1 | 11/2019 | Iida et al. |
| 2019/0359141 | A1* | 11/2019 | Iida ..................... B60R 11/04 |
| 2019/0361501 | A1 | 11/2019 | Park et al. |
| 2020/0020235 | A1 | 1/2020 | Smith |
| 2020/0079307 | A1 | 3/2020 | Asai et al. |

FOREIGN PATENT DOCUMENTS

| | | |
|---|---|---|
| JP | 2003-095028 A | 4/2003 |
| JP | 2008-148059 A | 6/2008 |
| JP | 2012-140106 A | 7/2012 |
| JP | 2012-195793 A | 10/2012 |
| JP | 2014-027353 A | 2/2014 |
| JP | 2015-202769 A | 11/2015 |
| JP | 2016-124391 A | 7/2016 |
| JP | 2017-58600 A | 3/2017 |
| WO | 2017/199888 A1 | 11/2017 |

OTHER PUBLICATIONS

Office Action dated May 19, 2020 in U.S. Appl. No. 16/407,474.
U.S. Appl. No. 16/407,474 filed May 9, 2019.
Office Action dated Oct. 31, 2019 in U.S. Appl. No. 16/411,564.
Notice of Allowance dated Jan. 23, 2020 in U.S. Appl. No. 16/411,564.
U.S. Appl. No. 16/411,564 filed May 14, 2019.
Office Action dated Sep. 8, 2020 by the U.S. Patent Office in U.S. Appl. No. 16/407,474.

* cited by examiner

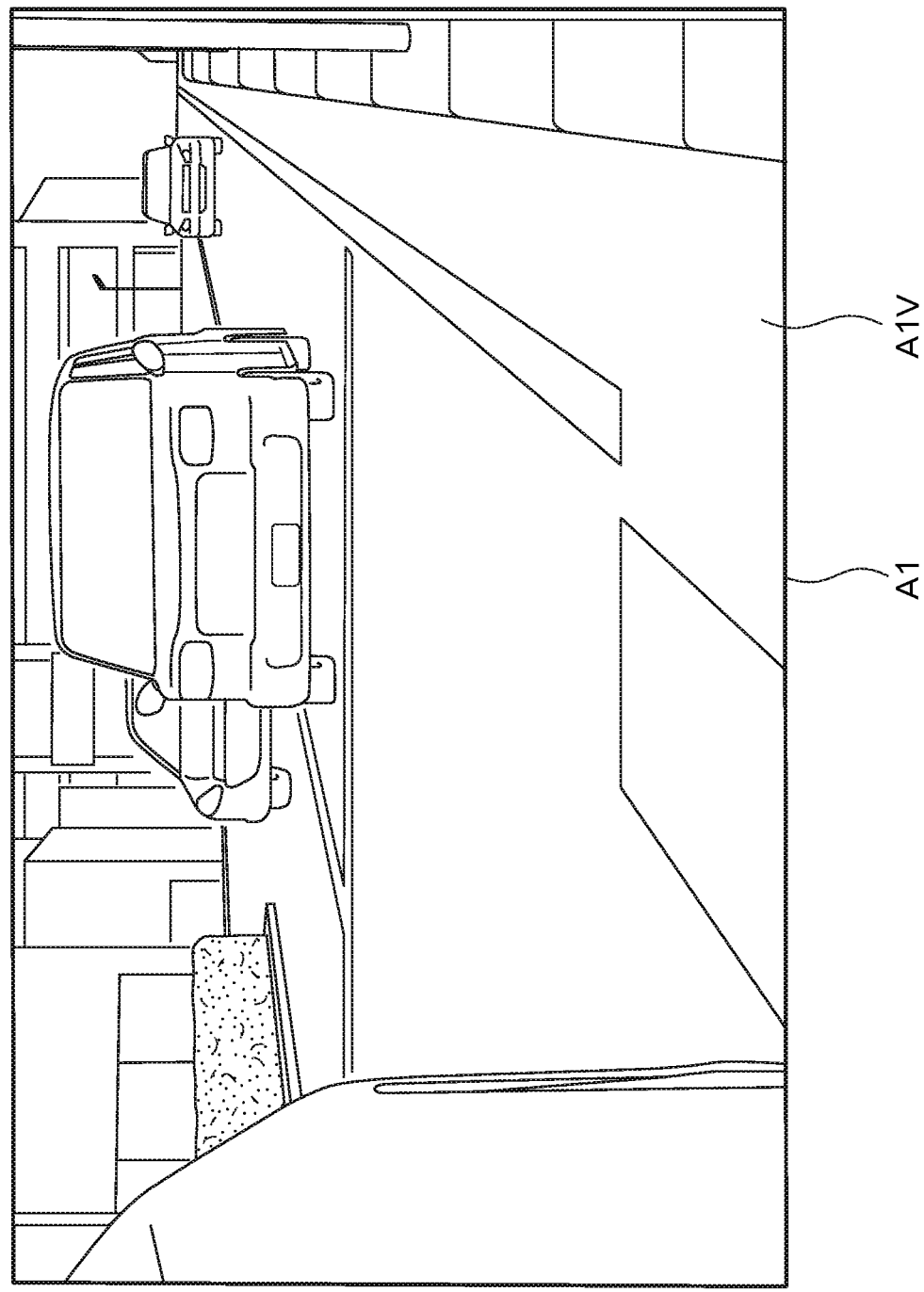

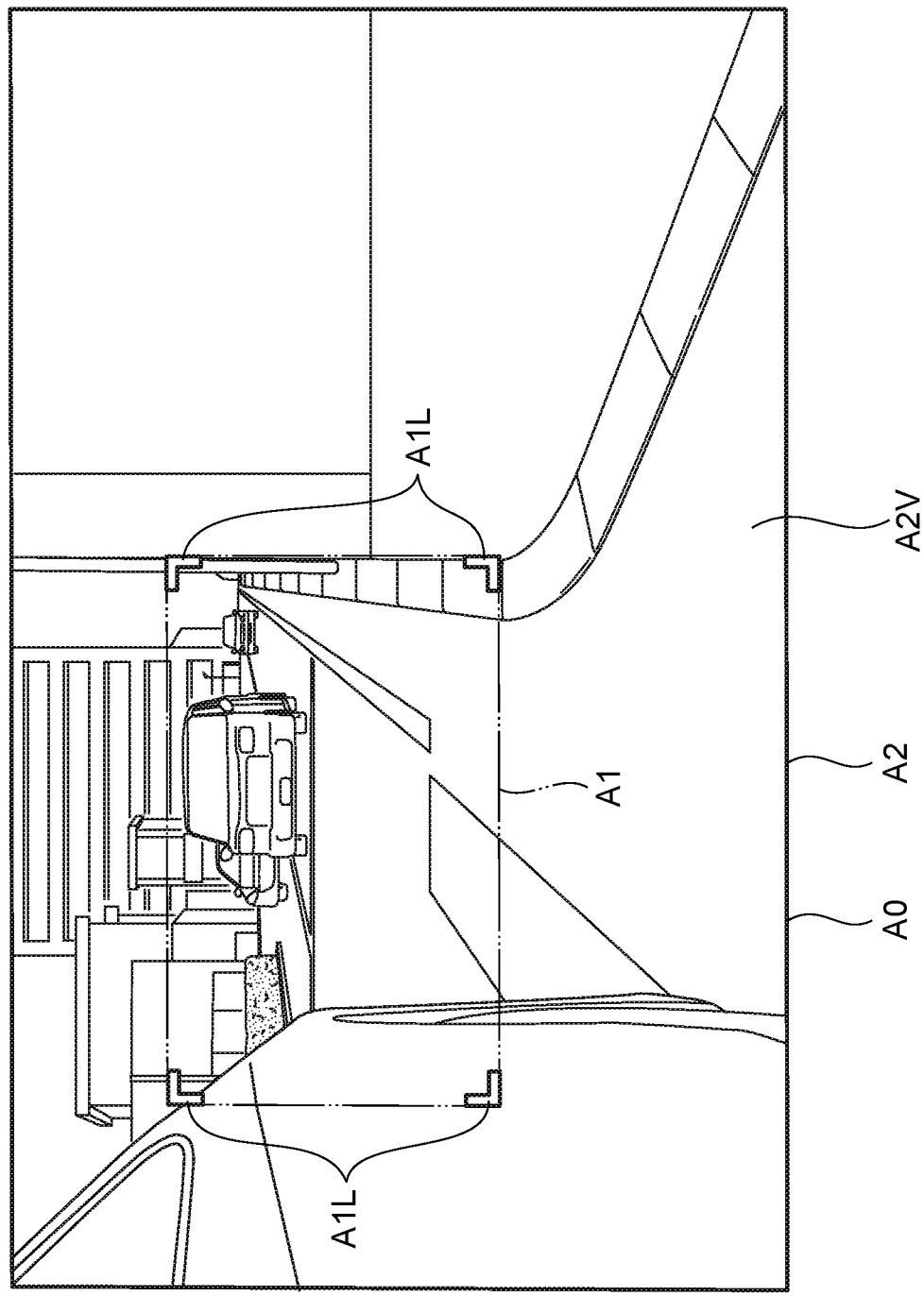

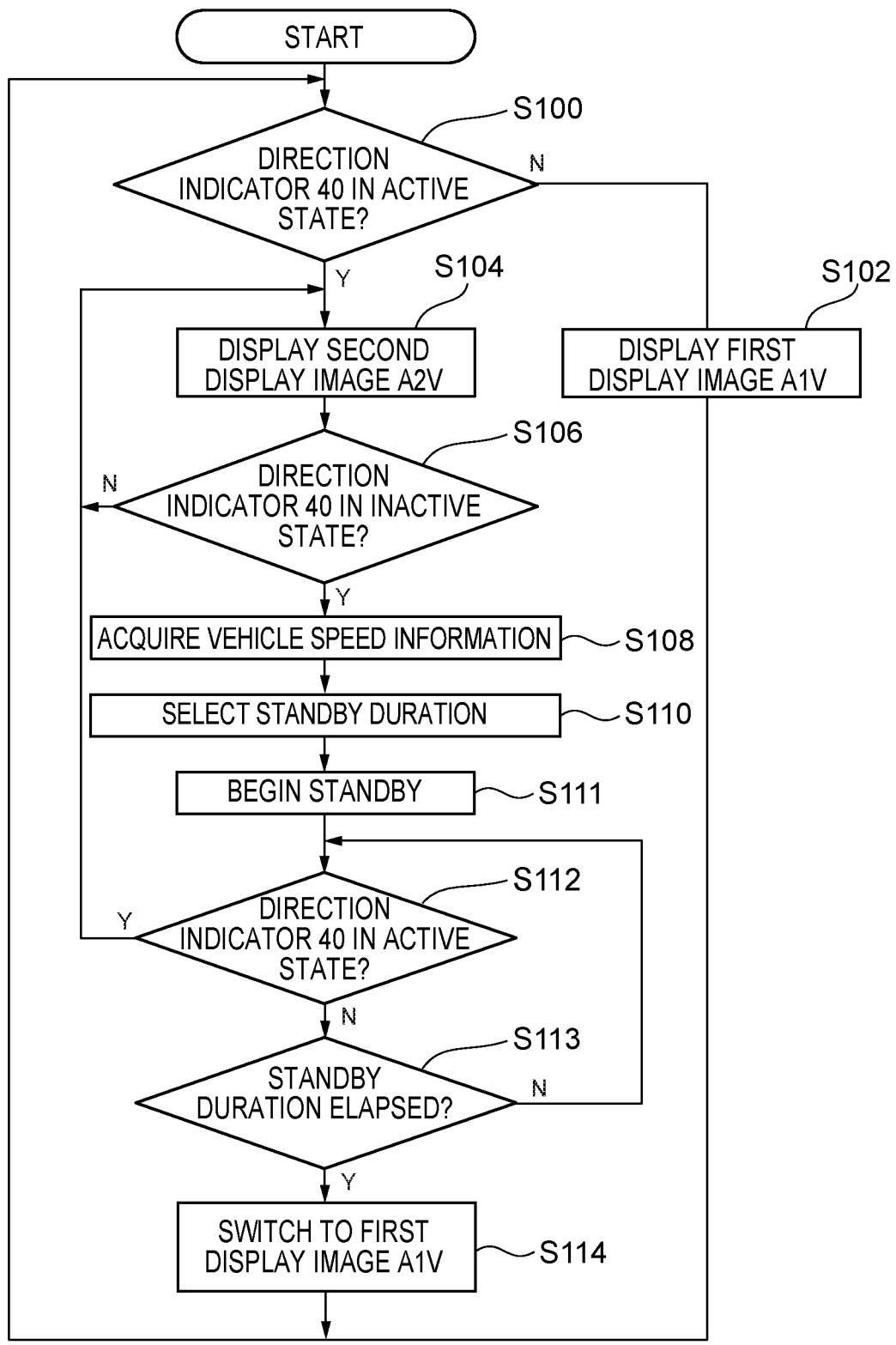

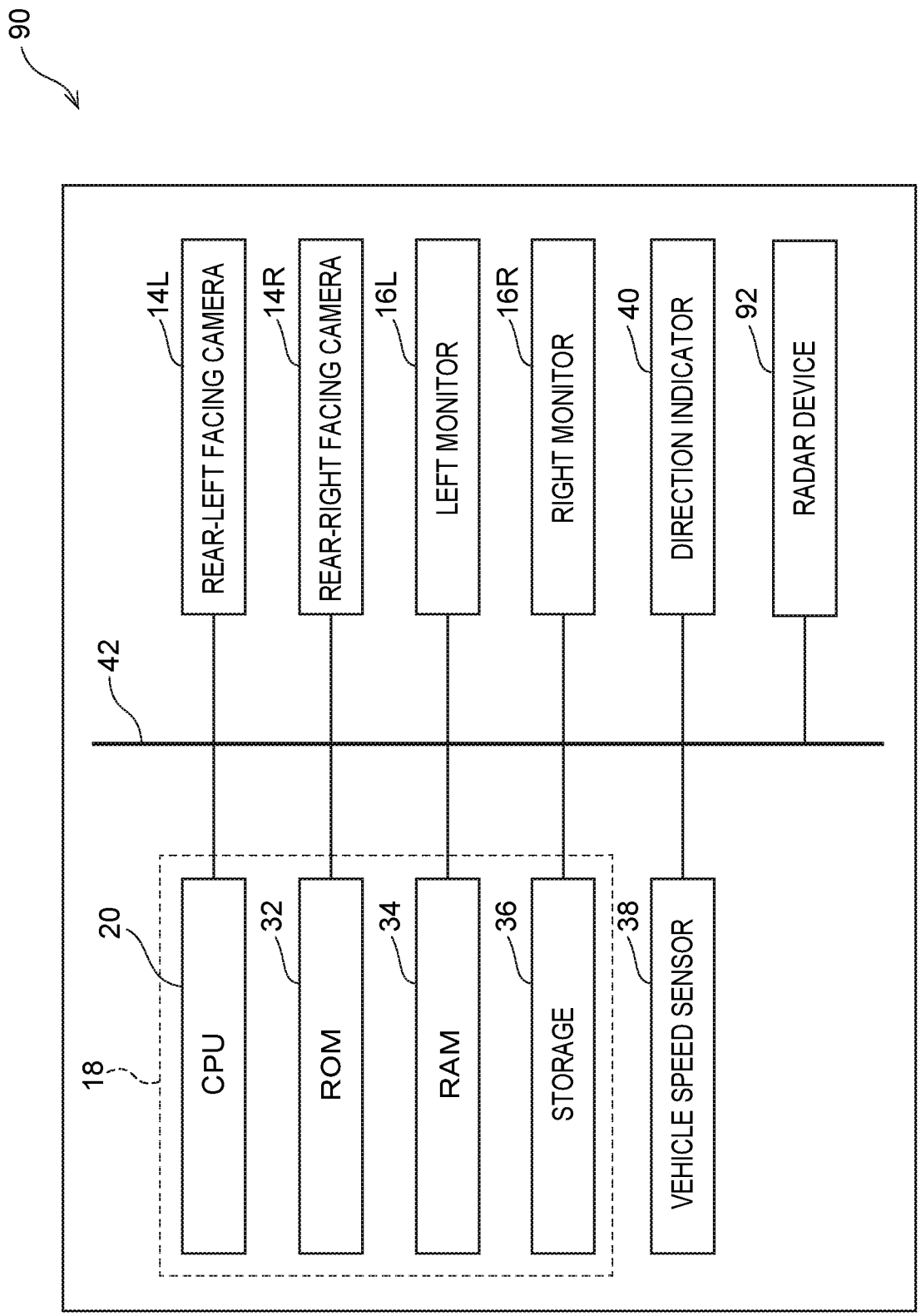

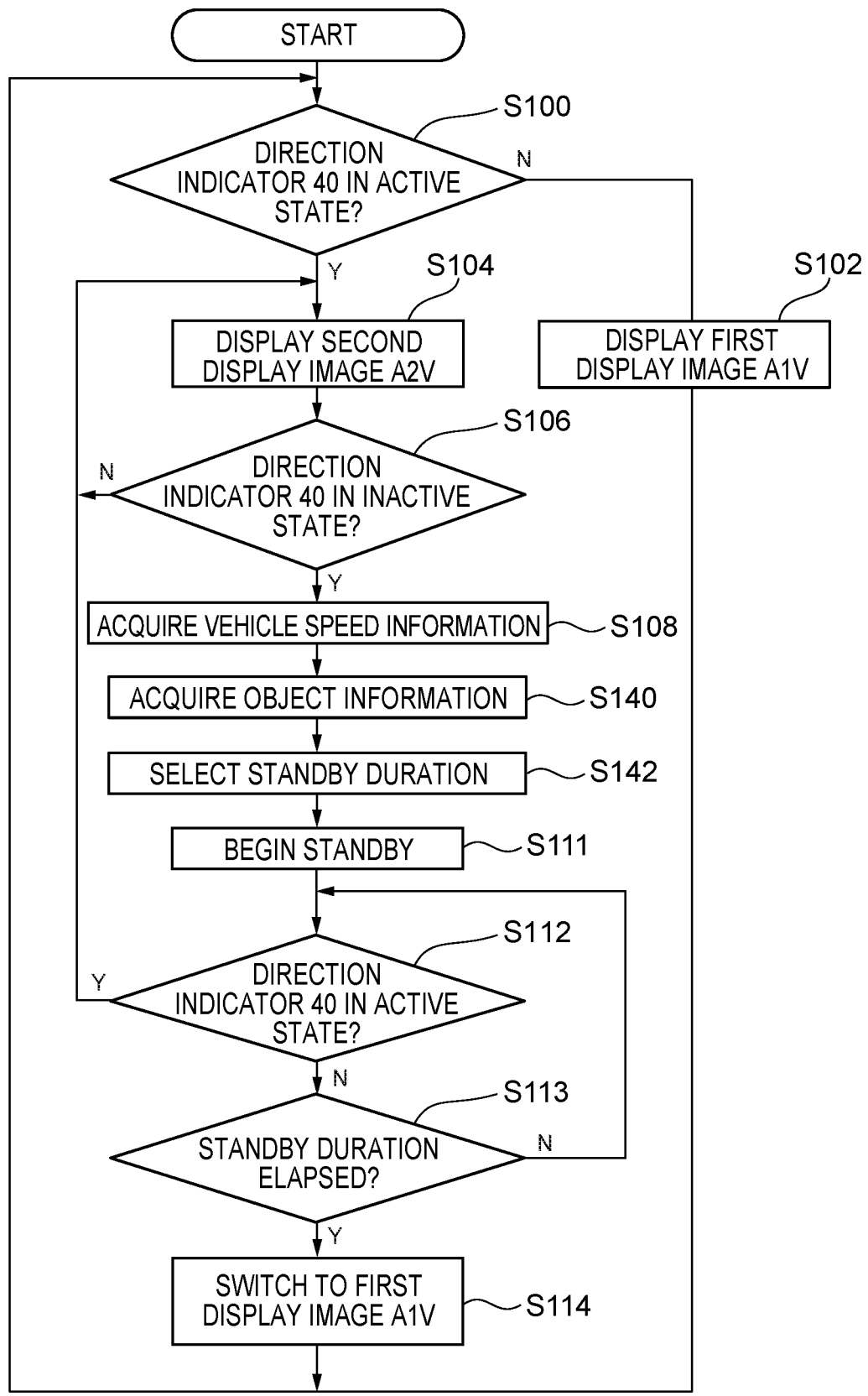

VEHICLE SURROUNDINGS DISPLAY DEVICE

CROSS-REFERENCE TO RELATED APPLICATION

This application claims priority under 35 USC 119 from Japanese Patent application No. 2018-166118 filed on Sep. 5, 2018, the disclosure of which is incorporated by reference herein in its entirety.

BACKGROUND

Technical Field

The present disclosure relates to a vehicle surroundings display device.

Related Art

Japanese Patent Application Laid-Open (JP-A) No. 2015-202769 discloses an invention relating to an electronic mirror system for a vehicle. This electronic mirror system includes an imaging section, a display section, and a display control section. The imaging section images sideways from the vehicle and toward the rear side of the vehicle so as to include at least part of the rear wheels of the vehicle. When a direction indicator is in an inactive state, the display control section enlarges a first area of an image captured by the imaging section, for example confined to the road a comparatively greater distance from the vehicle, and displays the first area on the display section. In cases in which the direction indicator is in an active state and either the vehicle is at a predetermined vehicle speed or lower or the steering angle of the vehicle is a predetermined steering angle or greater, the display control section displays on the display section an area of the image captured by the imaging section that is wider than the first area and includes the first area. This enables a driver to view a wider range sideways from the vehicle and to the rear side of the vehicle when the vehicle is turning than when the vehicle is not turning, thereby enabling safer turning in which the wheels do not come off the road or ride up onto a curb.

However, in the configuration disclosed in JP-A No. 2015-202769, when the direction indicator is in the inactive state, the display on the display section switches to an image of the first area that is, for example, confined to the road a comparatively greater distance from the vehicle. Thus, after the direction indicator has been set to the active state, if the vehicle is briefly steered in a different direction to the turn direction while performing a turn, the direction indicator is set to the inactive state, resulting in the display on the display section being switched despite the turn having not yet been completed. Namely, the display on the display section is switched at a timing not intended by the driver, and the ease of the driving operation may suffer. There is accordingly room for improvement of the related art regarding this point.

SUMMARY

The present disclosure obtains a vehicle surroundings display device capable of improving the ease of a driving operation.

A first aspect of the present disclosure is a vehicle surroundings display device including an imaging device that images a region toward a rear side of a vehicle and sideways from the vehicle, a display device that is capable of displaying an image captured by the imaging device, and a display controller that displays a first predetermined area of the image as a first display image on the display device in cases in which a direction indicator of the vehicle is in an inactive state, that displays a second predetermined area of the image corresponding to an activated side of the direction indicator as a second display image on the display device in cases in which the direction indicator has transitioned from an inactive state to an active state, the second predetermined area being wider than the first predetermined area and including the first predetermined area, and that switches a display on the display device from the second display image to the first display image after a predetermined standby duration has elapsed when the direction indicator has transitioned from an active state to an inactive state.

According to the first aspect, the vehicle surroundings display device includes the imaging device, the display device, and the display controller. The imaging device images a region toward the rear side of the vehicle and sideways from the vehicle. The display device is capable of displaying an image captured by the imaging device. The display controller displays the first display image on the display device in cases in which the direction indicator of the vehicle is in the inactive state. The first display image is an image corresponding to the first predetermined area of the image captured by the imaging device. In cases in which the direction indicator has transitioned from the inactive state to the active state, the display controller displays the second display image on the display device. The second display image is an image corresponding to the second predetermined area in an image imaged by the imaging device on the activated side of the direction indicator, is wider than the first predetermined area, and includes the first predetermined area. Accordingly, when the direction indicator is in the inactive state, namely when the vehicle is not changing direction or changing course, an enlarged area in a region sideways from the vehicle and toward the rear side of the vehicle is displayed, facilitating the viewing of objects in this area. When the direction indicator is in the active state, a wider range can be displayed centered on the activated side of the direction indicator, namely, to the rear side of the vehicle in the direction in the vehicle width direction in which the vehicle is to move, there enabling the driver to easily ascertain the situation in the vehicle surroundings in the direction of this movement.

Note that when the direction indicator has transitioned from the active state to the inactive state, the display controller switches the display on the display device from the second display image to the first display image after the predetermined standby duration has elapsed. Thus, after the direction indicator has been set to the active state, even if the vehicle is briefly steered in a different direction to the prevailing steering direction in order to avoid an obstacle while steering, thereby setting the direction indicator to the inactive state, a state in which the second display image is displayed is maintained for the predetermined standby duration instead of switching immediately to the first display image. If the driver sets the direction indicator to the active state again prior to the predetermined standby duration elapsing, the second display image continues to be displayed on the display device, enabling the display to be suppressed from being switched at a timing not intended by the driver.

A second aspect of the present disclosure is the vehicle surroundings display device of the first aspect, wherein the display controller acquires vehicle speed information regarding the vehicle and modifies the predetermined standby duration according to the vehicle speed information.

According to the second aspect, the display controller acquires the vehicle speed information regarding the vehicle, and modifies the standby duration for switching the display from the second display image to the first display image according to the acquired vehicle speed information. This thereby enables the second display image to be switched to the first display image at a timing appropriate to the vehicle speed, enabling the driver to more accurately ascertain the situation in the surroundings of the vehicle.

A third aspect of the present disclosure is the vehicle surroundings display device of the second aspect, wherein the display controller modifies the predetermined standby duration so as to lengthen the predetermined standby duration in cases in which the acquired vehicle speed information corresponds to a predetermined vehicle speed or lower.

According to the third aspect, in cases in which the acquired vehicle speed information corresponds to the predetermined vehicle speed or lower, the display controller lengthens the standby duration for switching the display from the second display image to the first display image. Namely, occasions requiring a large steering angle (hereafter referred to simply as "large steering angles") are more common in cases in which the direction indicator is activated in a state in which the vehicle is traveling at the predetermined vehicle speed or lower, namely, at a relatively low speed, for example when turning left or right or changing direction. Thus, the vehicle is sometimes steered sharply in a different direction to the activation direction of the direction indicator after the direction indicator has been set to the active state, thereby cancelling the activation of the direction indicator (setting to the inactive state). In cases in which the direction indicator is set to the inactive state when traveling at a relatively low speed, the standby duration for switching from the second display image to the first display image is lengthened, such that if the driver again sets the direction indicator to the active state, the display device continues to display the second display image. Thus, display of a wide range sideways from the vehicle and to the rear side of the vehicle is maintained by the display device when steering at a large angle requiring closer attention to the situation in the vehicle surroundings, thereby helping the driver to ascertain the situation in the vehicle surroundings.

A fourth aspect of the present disclosure is the vehicle surroundings display device of the second aspect or the third aspect, wherein the display controller modifies the predetermined standby duration so as to shorten the predetermined standby duration in cases in which the acquired vehicle speed information corresponds to a predetermined vehicle speed or higher.

According to the fourth aspect, in cases in which the acquired vehicle speed information corresponds to the predetermined vehicle speed or higher, the display controller shortens the standby duration for switching the display from the second display image to the first display image. Namely, occasions requiring a small steering angle (hereafter referred to simply as "small steering angles") are more common in cases in which the direction indicator is activated in a state in which the vehicle is traveling at the predetermined vehicle speed or higher, namely at a relatively high speed, for example when changing lanes. When traveling at a relatively high speed, after the direction indicator has been activated the situation in the vehicle surroundings needs to be ascertained prior to actually steering, and so it is preferable to return to a normal state more quickly after steering, namely, in a state in which the direction indicator has changed from the active state to the inactive state. Thus, in cases in which the direction indicator is set to the inactive state when traveling at a relatively high speed, the standby duration for switching from the second display image to the first display image is shortened, enabling a quicker return to the normal state.

A fifth aspect of the present disclosure is the vehicle surroundings display device of any one of the first aspect to the fourth aspect, wherein, when switching between the first display image and the second display image, the display controller switches from one of the images to another of the images in stages while scaling-down or scaling-up the one image.

According to the fifth aspect, when switching between the first display image and the second display image, the display controller switches from one image to the other image in stages while scaling-down or scaling-up the one image, such that the size of objects appearing in the images changes in stages as the images are switched over. The driver is able to visually track the level of change in the size of such objects, such that the driver is less liable to misjudge the distance to the objects than in cases in which the display is switched in a manner resulting in a sudden change in size. This enables the driver to intuitively ascertain the distance to objects in the vehicle surroundings when the images are switched.

A sixth aspect of the present disclosure is the vehicle surroundings display device of any one of the first aspect to the fifth aspect, wherein the display controller acquires current location information relating to the vehicle and modifies the predetermined standby duration according to the current location information.

According to the sixth aspect, the display controller modifies the standby duration for switching the display from the second display image to the first display image according to the acquired current location information of the vehicle. Thus, the switchover from the second display image to the first display image can be made at a timing appropriate to the location where the vehicle is traveling, enabling the driver to more accurately ascertain the situation in the vehicle surroundings.

A seventh aspect of the present disclosure is the vehicle surroundings display device of any one of the first aspect to the sixth aspect, wherein the display controller acquires object information regarding objects in the surroundings of the vehicle and modifies the predetermined standby duration according to the object information.

According to the seventh aspect, the display controller modifies the standby duration for switching the display from the second display image to the first display image according to the acquired information regarding objects in the surroundings of the vehicle. This enables the switchover from the second display image to the first display image to be made at an appropriate timing according to the situation in the vehicle surroundings, such as whether an object in the vehicle surroundings is close to or far from the vehicle, thereby enabling the driver to more accurately ascertain the situation in the vehicle surroundings.

As described above, the vehicle surroundings display device according to the first aspect enables the ease of the driving operation to be improved.

The vehicle surroundings display device according to the second aspect to the seventh aspect enables the ease of the driving operation to be further improved.

BRIEF DESCRIPTION OF THE DRAWINGS

Exemplary embodiments of the present disclosure will be described in detail based on the following figures, wherein:

FIG. 4 is a schematic view illustrating an example of a first display image displayed on a display section of a vehicle surroundings display device according to the first exemplary embodiment:

FIG. 5 is a schematic view illustrating an example of a second display image displayed on a display section of a vehicle surroundings display device according to the first exemplary embodiment:

FIG. 7 is a flowchart illustrating a flow of operation of a vehicle surroundings display device according to the first exemplary embodiment;

FIG. 10 is a block diagram illustrating a hardware configuration of a vehicle surroundings display device according to a third exemplary embodiment; and FIG. 11 is a flowchart illustrating a flow of operation of a vehicle surroundings display device according to the third exemplary embodiment.

DESCRIPTION OF EMBODIMENTS

First Exemplary Embodiment

Figure 1:
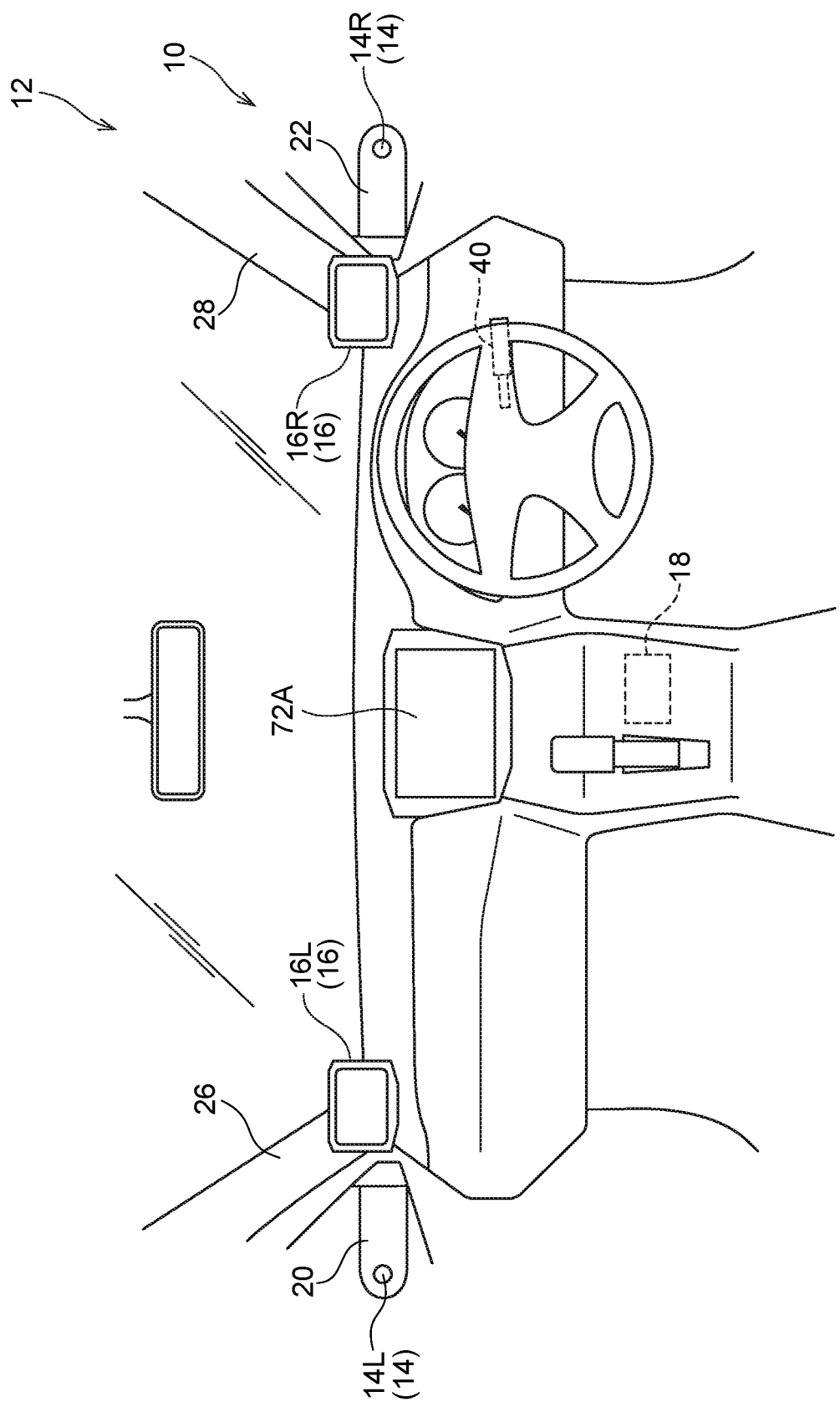
FIG. 1 is a schematic view illustrating an instrument panel of a vehicle including a vehicle surroundings display device according to a first exemplary embodiment, as viewed from a vehicle cabin inner side.

Explanation follows regarding a first exemplary embodiment of a vehicle surroundings display device according the present disclosure, with reference to FIG. 1 to FIG. 7. Note that in each of the drawings, the same reference numerals are allocated to the same or equivalent configuration elements and parts. Moreover, proportions in the drawings may be exaggerated to aid explanation and thus may differ from the actual proportions.

Overall Configuration

As illustrated in FIG. 1, a vehicle surroundings display device 10 includes a camera unit 14 serving as an imaging device mounted to a vehicle 12, a monitor unit 16 serving as a display device, and a display control device 18 serving as a display controller.

A base portion of a substantially rectangular block shaped camera support body 20 with a circular arc shaped leading end portion is attached to a vehicle front side end of a vehicle vertical direction intermediate portion of a left side door (front side door, not illustrated in the drawings) of the vehicle 12, such that the leading end portion of the camera support body 20 projects toward the vehicle outer side. A rear-left facing camera 14L configuring part of the camera unit 14 is attached in the vicinity of the leading end portion of the camera support body 20. An imaging optical axis (lens) of the rear-left facing camera 14L faces toward the rear-left of the vehicle so as to image a region to the rear-left side and sideways from the left of the vehicle. The camera support body 20 is capable of swinging in the vehicle front-rear direction about an axial direction running substantially along the vehicle vertical direction. Using drive force of an actuator, not illustrated in the drawings, the camera support body 20 is capable of swinging between a stowed position where the length direction of the camera support body 20 substantially follows an outer face of the vehicle, and a deployed position from which the rear-left facing camera 14L captures images at the rear-left of the vehicle. Specific configuration and operation of the rear-left facing camera 14L will be described later.

A base portion of a camera support body 22 that has a profile with left-right symmetry to the camera support body 20 is attached to a vehicle front side end of a vehicle vertical direction intermediate portion of a right side door (front side door, not illustrated in the drawings) of the vehicle 12. A rear-right facing camera 14R configuring another part of the camera unit 14 is attached in the vicinity of a leading end portion of the camera support body 22. An imaging optical axis (lens) of the rear-right facing camera 14R faces toward the rear-right of the vehicle so as to image a region to the rear-right side and sideways from the right of the vehicle. The camera support body 22 is also capable of swinging in the vehicle front-rear direction about an axial direction running substantially along the vehicle vertical direction. Using drive force of an actuator, not illustrated in the drawings, the camera support body 22 is capable of swinging between a stowed position where the length direction of the camera support body 22 substantially follows an outer face of the vehicle, and a deployed position from which the rear-right facing camera 14R captures images at the rear-right of the vehicle. Specific configuration and operation of the rear-right facing camera 14R will be described later.

A left monitor 16L configuring part of the monitor unit 16 is provided at a vehicle cabin inner side in the vicinity of a lower end of a left front pillar garnish 26. Specific configuration and operation of the left monitor 16L will be described later.

A right monitor 16R configuring another part of the monitor unit 16 is provided at the vehicle cabin inner side in the vicinity of a lower end of a right front pillar garnish 28. Specific configuration and operation of the right monitor 16R will be described later.

Hardware Configuration

Figure 2:
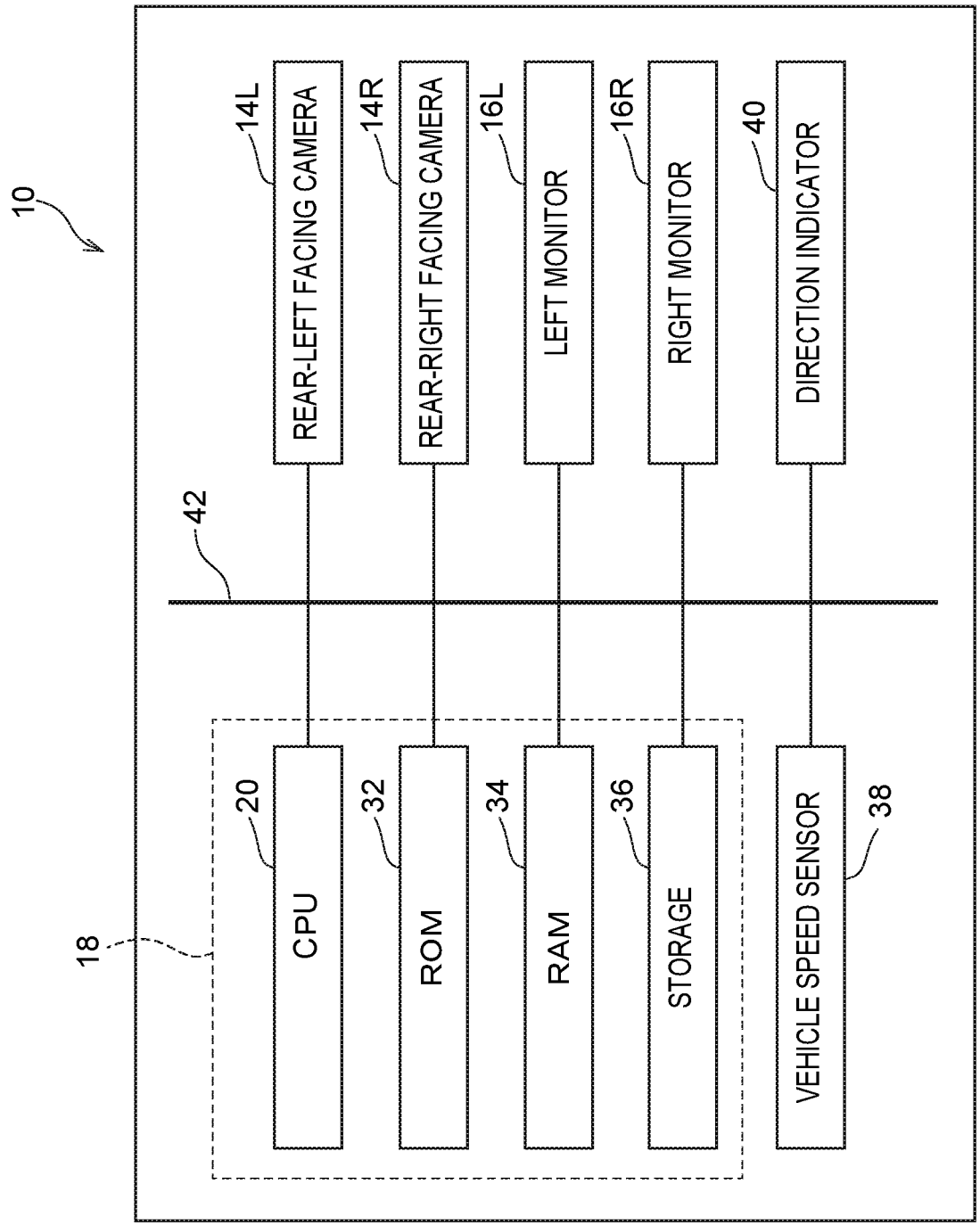
FIG. 2 is a block diagram illustrating a hardware configuration of a vehicle surroundings display device according to the first exemplary embodiment.

FIG. 2 is a block diagram illustrating a hardware configuration of the vehicle surroundings display device 10.

As illustrated in FIG. 2, the vehicle surroundings display device 10 is configured including a Central Processing Unit (CPU) 20, Read Only Memory (ROM) 32, Random Access Memory (RAM) 34, and storage 36, each provided within the display control device 18, as well as a vehicle speed sensor 38, the rear-left facing camera 14L, the rear-right facing camera 14R, the left monitor 16L, the right monitor 16R, and a direction indicator 40. These configuration elements are connected so as to be capable of communicating with each other through a bus 42.

The CPU 20 is a central processing unit that executes various programs and controls various sections. Namely, the CPU 20 reads a program from the ROM 32 or the storage 36, and executes the program using the RAM 34 as a workspace. The CPU 20 controls the various configuration elements and performs various computation processing according to the programs stored in the ROM 32 or the storage 36. In the present exemplary embodiment, an image processing program to perform image processing on images displayed on the monitor unit 16 (see FIG. 1) is held in the ROM 32 or the storage 36.

The ROM 32 holds various programs and various data. The RAM 34 serves as a workspace in which programs or data are temporarily stored. The storage 36 is configured by a Hard Disk Drive (HDD) or a Solid State Drive (SSD), and holds various programs and various data, including an operating system.

As an example, the vehicle speed sensor 38 is provided near to a drive mechanism of the vehicle 12, uses the rotation speed of the drive mechanism to detect the travel speed of the vehicle 12, and outputs this as vehicle speed information.

As an example, the rear-left facing camera 14L is not provided with a mechanism to adjust the orientation of the imaging optical axis, and has a lens with a fixed focal point and a relatively wide view angle. Thus, in a state in which the camera support body 20 is positioned at the deployed position, the rear-left facing camera 14L images in a fixed imaging range with a relatively wide view angle to the rear-left side of the vehicle.

Similarly to the rear-left facing camera 14L, as an example, the rear-right facing camera 14R is not provided with a mechanism to adjust the orientation of the imaging optical axis, and has a lens with a fixed focal point and a relatively wide view angle. Thus, in a state in which the camera support body 22 is positioned at the deployed position, the rear-right facing camera 14R images in a fixed imaging range with a relatively wide view angle to the rear-right side of the vehicle.

The left monitor 16L is a monitor for displaying images corresponding to the rear-left captured by the rear-left facing camera 14L, and is as an example configured by a liquid crystal display. Namely, the left monitor 16L functions as a substitute for a left outside mirror, and enables an occupant to check the situation in a restricted view region at the rear-left side of the vehicle by viewing an image displayed on the left monitor 16L.

The right monitor 16R is a monitor for displaying images corresponding to the rear-right captured by the rear-right facing camera 14R, and is as an example configured by a liquid crystal display. Namely, the right monitor 16R functions as a substitute for a right outside mirror, and enables the occupant to check the situation in a restricted view region at the rear-right side of the vehicle by viewing an image displayed on the right monitor 16R. Note that the left monitor 16L and the right monitor 16R have the same screen size as each other.

The direction indicator 40 is what is referred to a winker. When driving the vehicle with a large or a small steering angle, the driver employs the direction indicator 40 to communicate to the vehicle exterior which direction in the vehicle width direction the vehicle is moving toward by flashing non-illustrated winker lamps. The direction indicator 40 is provided near to a steering wheel 44 (see FIG. 1). The direction indicator 40 includes an automatic cancelling function that automatically places the direction indicator 40 in an inactive state when, after the steering wheel 44 has been steered in an activation direction (toward either vehicle width direction side) while the direction indicator 40 is in an active state, the steering wheel 44 is then steered toward the opposite side to the activation direction (the other side in the vehicle width direction) by a predetermined angle or greater.

Functional Configuration

In order to execute the image processing program, the vehicle surroundings display device 10 implements various functions using the above-described hardware resources. Explanation follows regarding the functional configuration implemented by the vehicle surroundings display device 10.

Figure 3:
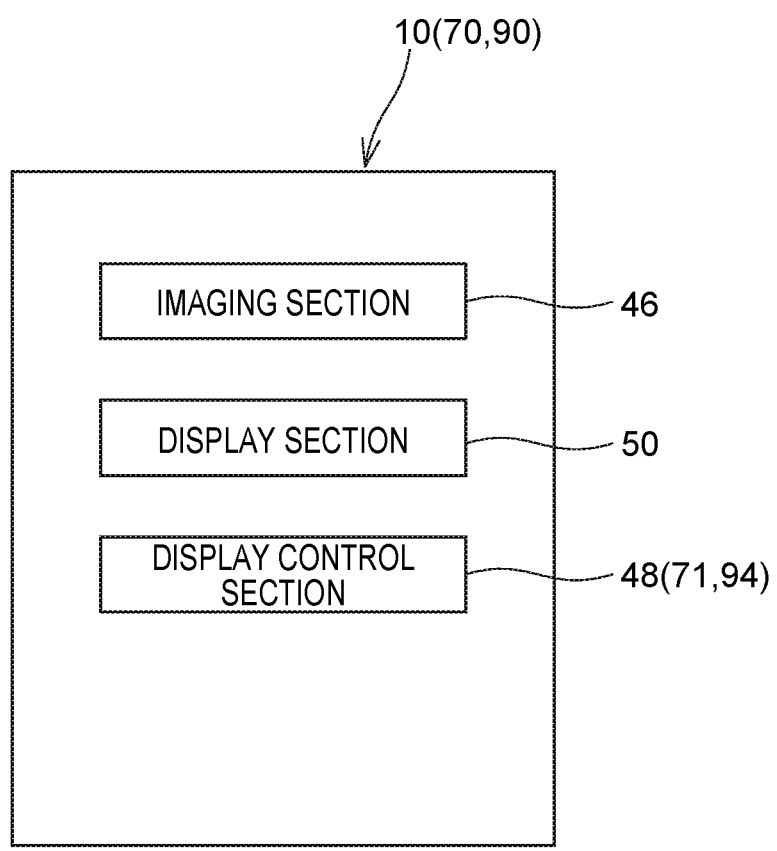
FIG. 3 is a block diagram illustrating an example of a functional configuration of a vehicle surroundings display device according to the first exemplary embodiment.

FIG. 3 is a block diagram illustrating an example of functional configuration of the vehicle surroundings display device 10.

As illustrated in FIG. 3, the vehicle surroundings display device 10 includes an imaging section 46, a display control section 48, and a display section 50 as functional configuration. Each functional configuration is implemented by the CPU 20 of the display control device 18 reading and executing the image processing program stored in the ROM 32 or the storage 36 (see FIG. 2).

The imaging section 46 captures video images of regions to the rear side of the vehicle and sideways from the vehicle using the camera unit 14. The camera unit 14 is configured by the rear-left facing camera 14L and the rear-right facing camera 14R, and so a region to the rear side of the vehicle and sideways from the vehicle is captured on both the left and right sides of the vehicle 12. Note that the regions sideways from the vehicle captured by the rear-left facing camera 14L and the rear-right facing camera 14R are ranges extending from the positions where the rear-left facing camera 14L and the rear-right facing camera 14R are provided to the vehicle 12 toward the rear side of the vehicle and the vehicle width direction outer sides.

The display control section 48 performs image processing on the images captured by the imaging section 46, and the display section 50 displays these processed images on the left monitor 16L and the right monitor 16R.

The display control section 48 receives images captured by the imaging section 46, performs image processing on the received images, and outputs these processed images to the display section 50. Namely, after image processing has been performed on an image captured by the rear-left facing camera 14L, the processed image is output to the left monitor 16L configuring part of the display section 50. Similarly, after image processing has been performed on an image captured by the rear-right facing camera 14R, the processed image is output to the right monitor 16R configuring another part of the display section 50.

As illustrated in FIG. 5, during the image processing, from an image of an overall area AO captured by the imaging section 46, the display control section 48 sets a first predetermined area A1, this being an area at a preset position configuring a portion of the overall area AO, and a second predetermined area A2, this being an area that is wider than the first predetermined area A1 and that includes the first predetermined area A1. The first predetermined area A1 is confined to a region toward the upper side of the overall area AO. The road at the rear side of the vehicle at a comparatively greater distance from the vehicle 12, and objects such as other vehicles appear in the overall area AO. The first predetermined area A1 is set to a predetermined screen aspect ratio adapted to the screen size of the left monitor 16L and the right monitor 16R. Note that first predetermined area boundary lines A1L are displayed at the four corners of a boundary between the first predetermined area A1 and another area.

As an example, the second predetermined area A2 is substantially the same as the overall area AO captured by the imaging section 46. The second predetermined area A2 is also set to a predetermined screen aspect ratio adapted to the screen size of the left monitor 16L and the right monitor 16R, and is set to the same screen aspect ratio as the first predetermined area A1. In other words, the second predetermined area A2 is a wider angle image (wider angle display) than the first predetermined area A1. To put it another way, the first predetermined area A1 is an enlarged image (enlarged display) zoomed in on a portion of the second predetermined area A2 (see FIG. 4, FIG. 5).

The display control section 48 illustrated in FIG. 3 determines whether the direction indicator 40 is in an active state or not (an inactive state). When the direction indicator 40 is in the inactive state, the display control section 48 displays the first predetermined area A1 of the image captured by the imaging section 46 as a first display image A1V on the display section 50 (see FIG. 4). When the direction indicator 40 is the active state, the display control section 48 displays the second predetermined area A2 of the image captured by the imaging section 46 corresponding to the side on which the direction indicator 40 has been activated as a second display image A2V on the display section 50 (see FIG. 5). Namely, when the direction indicator 40 is in the inactive state, both the left monitor 16L and the right monitor 16R display the first display images A1V (see FIG. 4). From this state, when the direction indicator 40 is then placed in the active state, the monitor out of the left monitor 16L or the right monitor 16R corresponding to the activated side of the direction indicator 40 switches from the first display image A1V to the second display image A2V (see FIG. 5).

When the direction indicator 40 has transitioned from the active state to the inactive state, the display control section 48 switches the display on the display section 50 from the second display image A2V to the first display image A1V after a predetermined standby duration has elapsed. As an example, this predetermined standby duration is within a range of from 0.5 seconds to 1.5 seconds, and is modified according to vehicle speed information acquired at the point in time when the direction indicator 40 transitions from the active state to the inactive state (the vehicle speed information for this point in time is hereafter referred to as the "vehicle speed at deactivation"). Specifically, in cases in which the vehicle speed at deactivation is 30 km/h or lower, the standby duration is set to 1.5 seconds. In cases in which the vehicle speed at deactivation is 80 km/h or higher, the standby duration is set to 0.5 seconds. Note that in cases in which the vehicle speed at deactivation is within a range between 30 km/h and 80 km/h, the standby duration is set to an appropriate duration of between 0.5 seconds and 1.5 seconds.

When switching between the first display image A1V and the second display image A2V, the display control section 48 switches from one image to another image in stages by scaling-down or scaling-up the one image. Namely, when switching from the first display image A1V to the second display image A2V, the first predetermined area A1 of the first display image A1V is scaled-down gradually in stages, in the sequence illustrated by FIG. 6A to FIG. 6D. When this is performed, the first predetermined area A1 is scaled-down until the entire second predetermined area A2 (namely, the second display image A2V) is displayed (see FIG. 6D), thereby completing the switchover. As illustrated in FIG. 6B to FIG. 6D, the first predetermined area boundary lines A1L are displayed when the first predetermined area A1 is scaled-down.

Figure 6A:
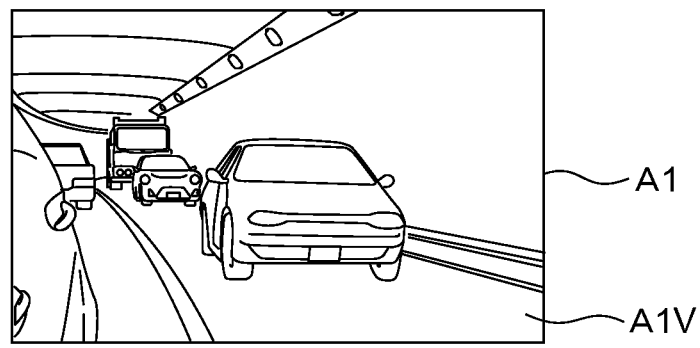
FIG. 6A to FIG. 6D are schematic views illustrating examples of display during a routine in which a first display image is switched to a second display image on a display section of a vehicle surroundings display device according to the first exemplary embodiment.
Figure 6B:
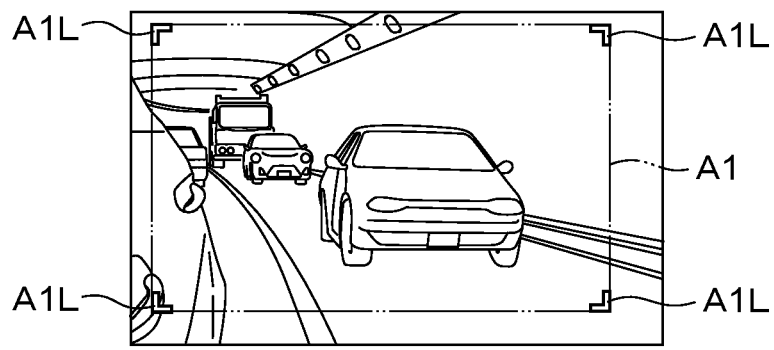
Figure 6C:
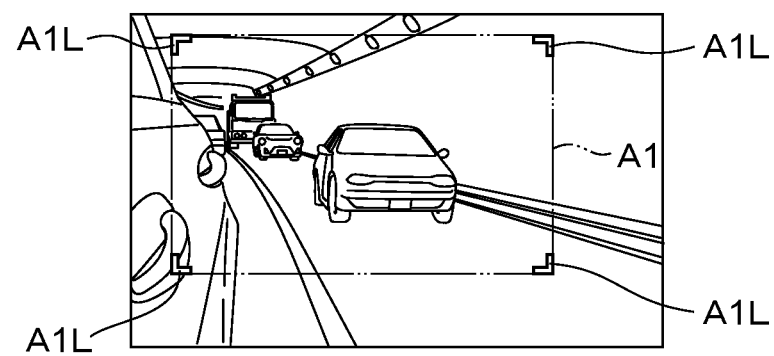
Figure 6D:
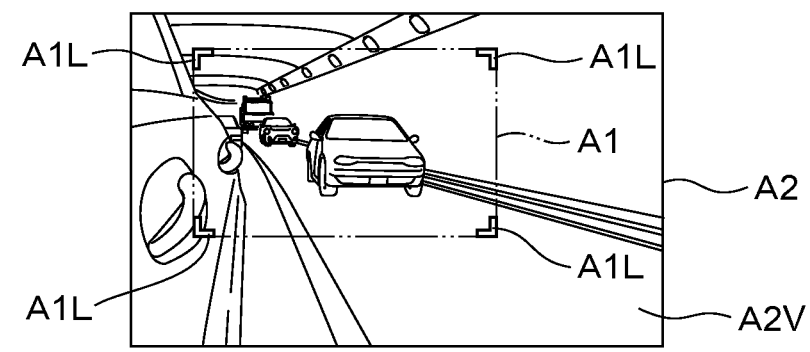

When switching from the second display image A2V to the first display image A1V, the first predetermined area A1 inside the second display image A2V is scaled-up gradually in stages in the sequence illustrated by FIG. 6D to FIG. 6A, namely in the reverse sequence to that described above. This scaling-up is performed until only the first predetermined area A1 (namely, the first display image A1V) is displayed (see FIG. 6A), thereby completing the switchover. In a state in which the first display image A1V is displayed, the first predetermined area boundary lines A1L are not displayed. Note that in the present exemplary embodiment, the switching from the first display image A1V to the second display image A2V by scaling-down in stages as described above, and the switching from the second display image A2V to the first display image A1V by scaling-up in stages as described above, are each performed within 0.5 seconds.

Processing Flow

Explanation follows regarding operation of the vehicle surroundings display device 10. FIG. 7 is a flowchart illustrating a flow of operation by the vehicle surroundings display device 10. The CPU 20 reads the image processing program from the ROM 32 or the storage 36 and expands the program in the RAM 34 to execute the program in order to perform image display.

The CPU 20 determines whether or not the direction indicator 40 is in the active state (step S100). In cases in which the direction indicator 40 is in the inactive state (step S100: NO), the CPU 20 displays the first predetermined areas A1 of the respective images captured by the rear-left facing camera 14L and the rear-right facing camera 14R on the left monitor 16L and the right monitor 16R as the first display images A1V (see FIG. 4) (step S102), and processing is then repeated from step S100. In cases in which the direction indicator 40 is in the active state (step S100: YES), from out of the images captured by the rear-left facing camera 14L and the rear-right facing camera 14R, the CPU 20 displays the second predetermined area A2 of the image that corresponds to the activated side of the direction indicator 40 as the second display image A2V (see FIG. 5) on the monitor unit 16 (either the left monitor 16L or the right monitor 16R) corresponding to the activated side of the direction indicator 40 (step S104). Note that on the opposite side to the activated side of the direction indicator 40, from out of the images captured by the rear-left facing camera 14L and the rear-right facing camera 14R, the CPU 20 displays the first predetermined area A1 of the image that corresponds to the opposite side to the activated side of the direction indicator 40 as the first display image A1V on the monitor unit 16 (either the left monitor 16L or the right monitor 16R) corresponding to the opposite side to the activated side of the direction indicator 40.

The CPU 20 determines whether or not the direction indicator 40 has transitioned from the active state to the inactive state (step S106). In cases in which the direction indicator 40 has not transitioned from the active state to the inactive state (the active state is maintained) (step S106: NO), the CPU 20 repeats the processing from step S104. In cases in which the direction indicator 40 has transitioned from the active state to the inactive state (step S106: YES), the CPU 20 acquires the vehicle speed information for that point in time (step S108), and selects a standby duration according to the vehicle speed information (step S110).

The CPU 20 begins standby for the selected standby duration (step S111). The CPU 20 then determines whether or not the direction indicator 40 has returned to the active state (step S112). In cases in which the direction indicator 40 is in the active state (step S112: YES), the CPU 20 repeats the processing from step S104. In cases in which the direction indicator 40 is not in the active state (namely, is in the inactive state) (step S112: NO), the CPU 20 determines whether or not the standby duration selected at step S110 has elapsed (step S113). In cases in which the standby duration selected at step S110 has not elapsed (step S113: NO), the CPU 20 repeats the processing from step S112. In cases in which the standby duration selected at step S110 has elapsed (step S113: YES), the CPU 20 displays the first display images A1V on the respective monitors of the monitor unit 16 (step S114). Processing is then repeated from step S100.

Operation and Advantageous Effects of First Exemplary Embodiment

Explanation follows regarding operation and advantageous effects of the first exemplary embodiment.

As illustrated in FIG. 1, in the present exemplary embodiment, the vehicle surroundings display device 10 includes the camera unit 14, the monitor unit 16, and the display control device 18. The camera unit 14 images regions to the rear side of the vehicle and sideways from the vehicle. The monitor unit 16 is capable of displaying images captured by the camera unit 14. When the direction indicator 40 of the vehicle 12 is in the inactive state, the display control device 18 displays the first display images A1V (see FIG. 4) on the respective monitors of the monitor unit 16. The first display image A1V is an image of the first predetermined area A1 (see FIG. 4) of an image captured by the imaging device. When the direction indicator 40 has transitioned from the inactive state to the active state, the display control device 18 displays the second display image A2V (see FIG. 5) on the monitor unit 16. The second display image A2V is an image of the second predetermined area A2 in the image corresponding to an activated side of the direction indicator 40 captured by the camera unit 14, and is wider than the first predetermined area A1 and includes the first predetermined area A1. Thus, when the direction indicator 40 is in the inactive state, namely, when the vehicle 12 is not changing direction or changing course, an enlarged area in a region sideways from the vehicle and to the rear side of the vehicle is displayed, facilitating the viewing of objects in this area. When the direction indicator 40 is in the active state, a wider range can be displayed centered on the activated side of the direction indicator 40, namely, to the rear side of the vehicle in the direction in the vehicle width direction in which the vehicle 12 is to move, there enabling the driver to easily ascertain the situation in the vehicle surroundings in the direction of this movement.

Note that when the direction indicator 40 has transitioned from the active state to the inactive state, the display control device 18 switches the display on the monitor unit 16 from the second display image A2V to the first display image A1V after a predetermined standby duration has elapsed. Thus, after the direction indicator 40 has been set to the active state, even if the vehicle is briefly steered in a different direction to the prevailing steering direction in order to avoid an obstacle while steering, thereby setting the direction indicator 40 to the inactive state, a state in which the second display image A2V is displayed is maintained for the predetermined standby duration instead of switching immediately to the first display image A1V. If the driver sets the direction indicator 40 to the active state again prior to the predetermined standby duration elapsing, the second display image A2V continues to be displayed on the monitor unit 16, enabling a confusing impression caused by frequent switching of the display to be suppressed from being imparted to the driver. This also enables the display to be suppressed from being switched at a timing not intended by the driver. This enables the ease of the driving operation to be improved.

Moreover, the display control device 18 acquires the vehicle speed information for the vehicle 12, and modifies the standby duration for switching the display from the second display image A2V to the first display image A1V according to the acquired vehicle speed information. This enables the switchover from the second display image A2V to the first display image A1V to be made at a timing appropriate to the vehicle speed, enabling the driver to more accurately ascertain the situation in the vehicle surroundings.

Furthermore, in cases in which the acquired vehicle speed information corresponds to a predetermined vehicle speed or lower, the display control device 18 lengthens the standby duration for switching the display from the second display image A2V to the first display image A1V. Namely, large steering angles are more common in cases in which the direction indicator 40 is activated in a state in which the vehicle 12 is traveling at the predetermined vehicle speed or lower, namely, at a relatively low speed, for example when turning left or right or changing direction. Thus, the vehicle 12 is sometimes steered sharply in a different direction to the activation direction of the direction indicator 40 after the direction indicator 40 has been set to the active state, thereby cancelling the activation of the direction indicator 40 (setting to the inactive state). In cases in which the direction indicator 40 is set to the inactive state when traveling at a relatively low speed, the standby duration for switching from the second display image A2V to the first display image A1V is lengthened, such that if the driver again sets the direction indicator 40 to the active state, the monitor unit 16 continues to display the second display image A2V. Thus, display of a wide range sideways from the vehicle and to the rear side of the vehicle is maintained by the monitor unit 16 when steering at a large angle requiring closer attention to the situation in the vehicle surroundings, thereby helping the driver to ascertain the situation in the vehicle surroundings.

Furthermore, in cases in which the acquired vehicle speed information corresponds to a predetermined vehicle speed or higher the display control device 18 shortens the standby duration for switching the display from the second display image A2V to the first display image A1V. Namely, small steering angles are more common in cases in which the direction indicator 40 is activated in a state in which the vehicle 12 is traveling at the predetermined vehicle speed or higher, namely at a relatively high speed, for example when changing lanes. When traveling at a relatively high speed, after the direction indicator 40 has been activated the situation in the vehicle surroundings needs to be ascertained prior to actually steering, and so it is preferable to return to a normal state more quickly after steering, namely, in a state in which the direction indicator 40 has changed from the active state to the inactive state. Thus, in cases in which the direction indicator 40 is set to the inactive state when traveling at a relatively high speed, the standby duration for switching from the second display image A2V to the first display image A1V is shortened, enabling a quicker return to the normal state.

As illustrated in FIG. 6, when switching between the first display image A1V and the second display image A2V, the display control device 18 switches from one image to the other image in stages while scaling-down or scaling-up the one image, such that the size of objects appearing in the images changes in stages as the images are switched over. The driver is able to visually track the level of change in the size of such objects, such that the driver is less liable to misjudge the distance to the objects than in cases in which the display is switched in a manner resulting in a sudden change in size. This enables the driver to intuitively ascertain the distance to objects in the vehicle surroundings when the images are switched. This enables the ease of the driving operation to be further improved.

Second Exemplary Embodiment

Figure 8:
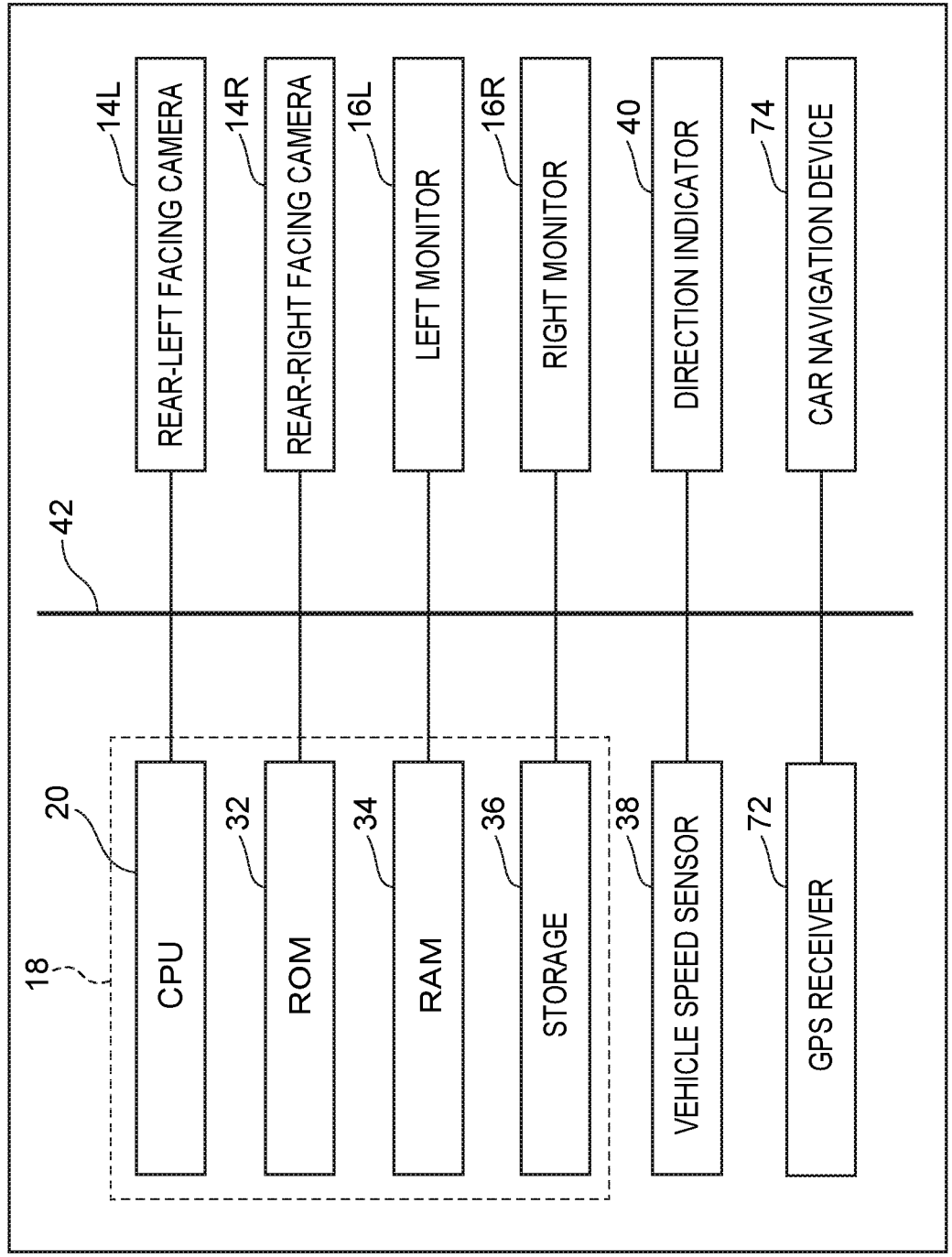
FIG. 8 is a block diagram illustrating a hardware configuration of a vehicle surroundings display device according to a second exemplary embodiment.
Figure 9:
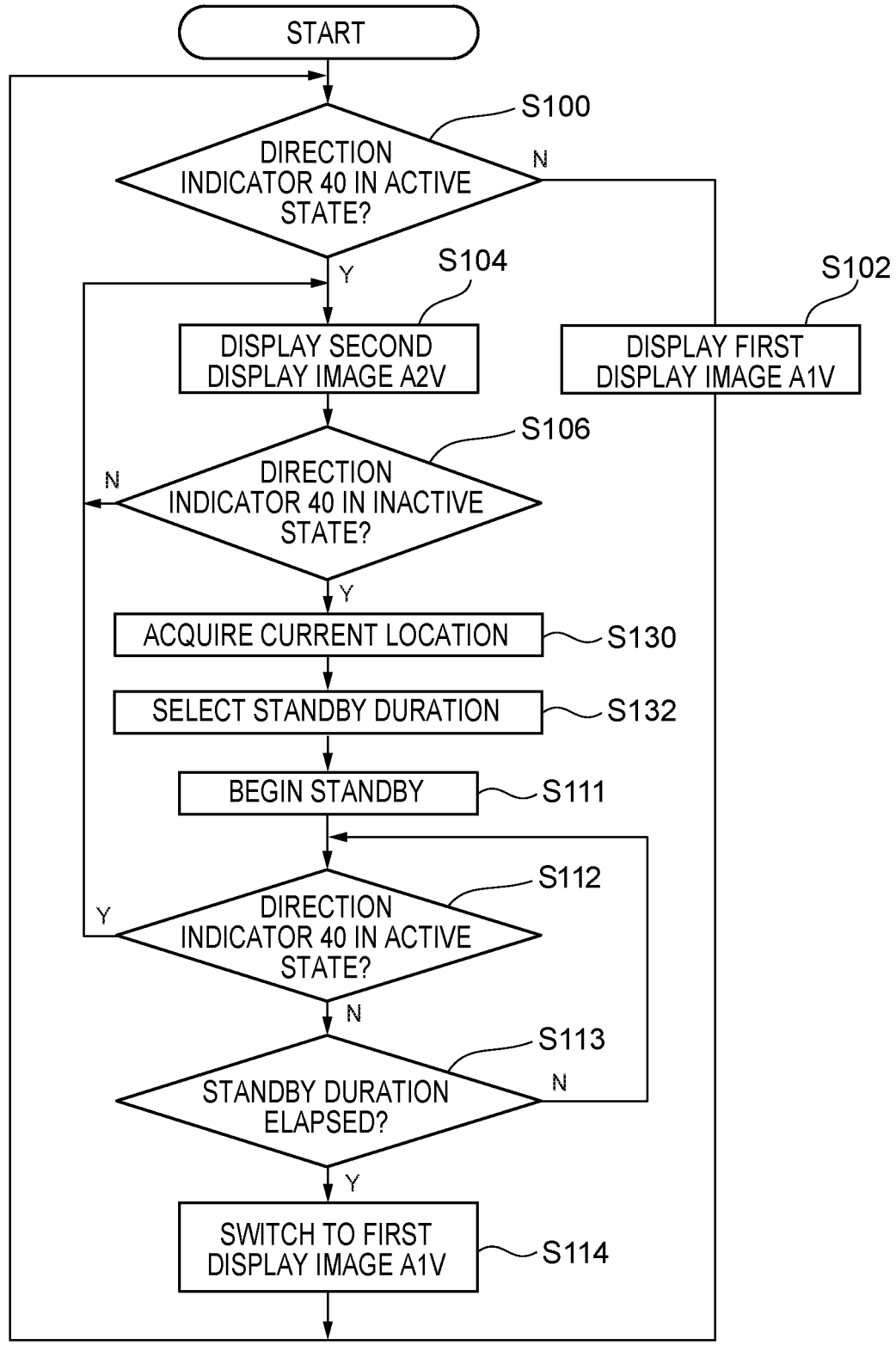
FIG. 9 is a flowchart illustrating a flow of operation of a vehicle surroundings display device according to the second exemplary embodiment.

Explanation follows regarding a vehicle surroundings display device according to a second exemplary embodiment of the present disclosure, with reference to FIG. 8 and FIG. 9. Note that configuration portions the same as those in the first exemplary embodiment described above are appended with the same reference numerals, and explanation thereof is omitted.

A vehicle surroundings display device 70 according to the second exemplary embodiment has the same basic configuration as that of the first exemplary embodiment, and is provided with a feature that a standby duration is modified according to current location information.

Hardware Configuration

As illustrated in FIG. 8, the vehicle surroundings display device 70 is configured including the CPU 20, the ROM 32, the RAM 34, the storage 36, the vehicle speed sensor 38, the rear-left facing camera 14L, the rear-right facing camera 14R, the left monitor 16L, the right monitor 16R, the direction indicator 40, a GPS receiver 72, and a car navigation device 74. These configuration elements are connected so as to be capable of communicating with each other through the bus 42.

The GPS receiver 72 receives signals from plural satellites and uses a GPS method to identify the current position of the vehicle 12 from the different arrival times of the signals.

The car navigation device 74 compares the current position of the vehicle 12 acquired through the GPS receiver 72 against map information stored in a storage medium such as a DVD or hard disk to precisely detect the current position of the vehicle 12 on the map, and displays the current position of the vehicle 12 on a map displayed on a display device 72A (see FIG. 1). The car navigation device 74 also includes functions such as a function of acquiring information regarding the vicinity of the current position of the vehicle 12 (such as information regarding various facilities) from the storage medium and displaying this information on the display device 72A, and a function of providing route guidance to a preset destination, according to instruction by an occupant.

Functional Configuration

As illustrated in FIG. 3, the vehicle surroundings display device 70 includes the imaging section 46, a display control section 71, and the display section 50 as functional configuration. The various functional configuration is implemented by the CPU 20 reading and executing an image processing program stored in the ROM 32 or the storage 36 (see FIG. 8).

The display control section 71 has basically the same configuration as the display control section 48 of the first exemplary embodiment. Namely, when the direction indicator 40 has transitioned from the active state to the inactive state, the display control section 71 switches the display on the display section 50 from the second display image A2V to the first display image A1V after a predetermined standby duration has elapsed. As an example, this predetermined standby duration is within a range of from 0.5 seconds to 1.5 seconds. The display control section 71 modifies the standby duration according to the current location of the vehicle 12 on the map, as acquired from the car navigation device 74 at the point in time when the direction indicator 40 transitions from the active state to the inactive state (the current location information of the vehicle 12 at this point in time is hereafter referred to as the "position at deactivation"). Specifically, in cases in which the position at deactivation corresponds to an intersection or the vicinity thereof, the standby duration is set to 1.5 seconds. In cases in which the position at deactivation corresponds to an expressway or a road where there is no intersection or the like, the standby duration is set to 0.5 seconds.

Processing Flow

Explanation follows regarding operation of the vehicle surroundings display device 70. FIG. 9 is a flowchart illustrating a flow of operation by the vehicle surroundings display device 70. The CPU 20 reads the image processing program from the ROM 32 or the storage 36 and expands and executes the program in the RAM 34 to display images. Note that similar processing to that in the first exemplary embodiment is allocated the same reference numerals and explanation thereof is omitted.

At step S106, in cases in which the direction indicator 40 has transitioned from the active state to the inactive state (step S106: YES), the CPU 20 acquires the position at deactivation (current location information) at this point in time (step S130), and selects a standby duration according to the position at deactivation (step S132).

The CPU 20 begins standby for the selected standby duration (step S111). The CPU 20 then determines whether or not the direction indicator 40 has returned to the active state (step S112). In cases in which the direction indicator 40 is in the active state (step S112: YES), the CPU 20 repeats the processing from step S104. In cases in which the direction indicator 40 is not in the active state (namely, is in the inactive state) (step S112: NO), the CPU 20 determines whether or not the standby duration selected at step S132 has elapsed (step S113). In cases in which the standby duration selected at step S132 has not elapsed (step S113: NO), the CPU 20 repeats the processing from step S112. In cases in which the standby duration selected at step S132 has elapsed (step S113: YES), the CPU 20 displays the first display images A1V on the respective monitors of the monitor unit 16 (step S114). Processing is then repeated from step S100.

Operation and Advantageous Effects of Second Exemplary Embodiment

Explanation follows regarding operation and advantageous effects of the second exemplary embodiment.

With the exception of the fact that the standby duration is modified according to the current location information, the above configuration is configured similarly to the vehicle surroundings display device 10 of the first exemplary embodiment and therefore obtains effects that are similar to those of the first exemplar) embodiment. Moreover, the display control section 71 modifies the standby duration for switching the display from the second display image A2V to the first display image A1V according to the acquired current location information of the vehicle 12. Thus, the switchover from the second display image A2V to the first display image A1V can be made at a timing appropriate to the location where the vehicle 12 is traveling, enabling the driver to more accurately ascertain the situation in the vehicle surroundings. This enables the ease of the driving operation to be further improved.

Note that although the standby duration is modified based only on the current location information in the present exemplary embodiment, there is no limitation thereto. Modification of the standby duration may take into consideration vehicle speed information or the like alongside the current location information.

Third Exemplary Embodiment

Explanation follows regarding a vehicle surroundings display device according to a third exemplary embodiment of the present disclosure, with reference to FIG. 10 and FIG. 11. Note that the same configuration portions as those in the first exemplary embodiment and so on described above are appended with the same reference numerals, and explanation thereof is omitted.

A vehicle surroundings display device 90 according to the third exemplary embodiment has basically the same configuration as that of the first exemplary embodiment, and is provided with a feature that a standby duration is modified according to information regarding objects in the surroundings of the vehicle 12.

Hardware Configuration

As illustrated in FIG. 10, the vehicle surroundings display device 90 is configured including the CPU 20, the ROM 32, the RAM 34, the storage 36, the vehicle speed sensor 38, the rear-left facing camera 14L, the rear-right facing camera 14R, the left monitor 16L, the right monitor 16R, the direction indicator 40, and a radar device 92. These configuration elements are connected so as to be capable of communicating with each other through the bus 42.

As an example, the radar device 92 monitors the surroundings of the vehicle 12 using laser radar, electromagnetic wave radar, an ultrasound sensor, or the like, and detects information regarding objects that might affect the vehicle 12 based on the monitoring result. As an example, this object information includes the distance and direction of each object with respect to the vehicle 12, and the object type. Note that the radar device 92 may utilize an existing system such as a blind spot monitor.

Functional Configuration

As illustrated in FIG. 3, the vehicle surroundings display device 90 includes the imaging section 46, a display control section 94, and the display section 50 as functional configuration. The various functional configuration is implemented by the CPU 20 reading and executing an image processing program stored in the ROM 32 or the storage 36 (see FIG. 10).

The display control section 94 has basically the same configuration as the display control section 48 of the first exemplary embodiment. Namely, in cases in which the direction indicator 40 has transitioned from the active state to the inactive state, the display control section 94 switches the display on the display section 50 from the second display image A2V to the first display image A1V after a predetermined standby duration has elapsed. As an example, this predetermined standby duration is 0.5 seconds or longer, and is modified according to the vehicle speed at deactivation. Specifically, in cases in which the vehicle speed at deactivation is 30 km/h or lower, the standby duration is set to 1.5 seconds. In cases in which the vehicle speed at deactivation is 80 km/h or higher, the standby duration is set to 0.5 seconds. Note that in cases in which the vehicle speed at deactivation is within a range between 30 km/h and 80 km/h, the standby duration is set to an appropriate duration of between 0.5 seconds and 1.5 seconds.

The display control section 94 modifies the standby duration according to object information acquired from the radar device 92 at the point in time when the direction indicator 40 transitions from the active state to the inactive state (the object information at this point in time is hereafter referred to as the "surroundings information at deactivation"). Specifically, in cases in which no objects that might affect the vehicle 12 are detected in the surroundings information at deactivation on the activated side when the direction indicator 40 is set to the active state, the standby duration is set to a duration based on the vehicle speed at deactivation. However, in cases in which another vehicle close to the vehicle 12 is detected in the surroundings information at deactivation on what was the activated side when the direction indicator 40 in the active state, determination is made that "the driver attempted to change lanes, but has aborted the lane change due to the presence of another vehicle", and the standby duration is modified by being lengthened as appropriate. Thus, a state is maintained in which the driver can easily ascertain the situation in the wider vehicle surroundings, thereby facilitating judgement of a timing at which to repeat the lane change attempt.

Processing Flow

Explanation follows regarding operation of the vehicle surroundings display device 90. FIG. 11 is a flowchart illustrating a flow of operation by the vehicle surroundings display device 90. The CPU 20 reads the image processing program from the ROM 32 or the storage 36 and expands and executes the program in the RAM 34 to display images. Note that similar processing to that in the first exemplary embodiment is allocated the same reference numerals and explanation thereof is omitted.

At step S106, in cases in which the direction indicator 40 has transitioned from the active state to the inactive state (step S106: YES), the CPU 20 acquires the vehicle speed information at this point in time (step S108). The CPU 20 then acquires the surroundings information at deactivation (object information) on the side corresponding to what was the activated side when the direction indicator 40 was in the active state (step S140), and selects a standby duration according to the vehicle speed and object information (step S142).

The CPU 20 begins standby for the selected standby duration (step S111). The CPU 20 then determines whether or not the direction indicator 40 has returned to the active state (step S112). In cases in which the direction indicator 40 is in the active state (step S112: YES), the CPU 20 repeats the processing from step S104. In cases in which the direction indicator 40 is not in the active state (namely, is in the inactive state) (step S112: NO), the CPU 20 determines whether or not the standby duration selected at step S142 has elapsed (step S113). In cases in which the standby duration selected at step S142 has not elapsed (step S113: NO), the CPU 20 repeats the processing from step S112. In cases in which the standby duration selected at step S142 has elapsed (step S113: YES), the CPU 20 displays the first display images A1V on the respective monitors of the monitor unit 16 (step S114). Processing is then repeated from step S100.

Operation and Advantageous Effects of Third Exemplary Embodiment

Explanation follows regarding operation and advantageous effects of the third exemplary embodiment.

With the exception of the fact that the standby duration is modified according to the object information regarding objects in the surroundings of the vehicle 12, the above configuration is configured similarly to the vehicle surroundings display device 10 of the first exemplary embodiment and therefore obtains effects that are similar to those of the first exemplary embodiment. Moreover, the display control section 94 modifies the standby duration for switching the display from the second display image A2V to the first display image A1V according to the acquired object information regarding objects in the surroundings of the vehicle 12. This enables the switchover from the second display image A2V to the first display image A1V to be made at an appropriate timing according to the situation in the vehicle surroundings, such as whether an object in the vehicle surroundings is close to or far from the vehicle 12, thereby enabling the driver to more accurately ascertain the situation in the vehicle surroundings. This enables the ease of the driving operation to be further improved.

Note that although the standby duration is set within a range of from 0.5 seconds to 1.5 seconds in the first to third exemplary embodiments described above, there is no limitation thereto, and the standby duration may be set to another duration.

Although the camera unit 14 serving as an imaging device is configured by the rear-left facing camera 14L and the rear-right facing camera 14R in the first to third exemplary embodiments, there is no limitation thereto. The camera unit 14 may be configured by three or more cameras, radar devices, or the like, or may be configured by a single camera, radar device, or the like.

Although the monitor unit 16 serving as a display device is configured by the left monitor 16L and the right monitor 16R, there is no limitation thereto. The monitor unit 16 may be configured by three or more monitors, or may be configured by a single monitor.

Moreover, although the standby duration is modified by being shortened at a predetermined vehicle speed or higher and lengthened at a predetermined vehicle speed or lower, there is no limitation thereto. A configuration may be applied in which a standby duration is only modified by being shortened at a predetermined vehicle speed or higher, or a standby duration is only modified by being lengthened at a predetermined vehicle speed or lower.

The vehicle surroundings display devices according to the exemplary embodiments described above may be understood from a different perspective. For example, the issue that the vehicle surroundings display device according to the first exemplary embodiment is attempting to resolve (the object) may be understood as "enabling a driver to intuitively ascertain the distance between a vehicle and an object in the vehicle surroundings when images are switched".

If the issue is understood to be that described above, the invention as a solution to this issue may, for example, be understood in the following manner.

"A vehicle surroundings display device including:

an imaging device that images sideways from a vehicle and toward a rear side of the vehicle:

a display device that is capable of displaying an image captured by the imaging device; and a display controller that displays a first predetermined area of the image as a first display image on the display device in cases in which a direction indicator of the vehicle is in an inactive state, that displays a second predetermined area of the image corresponding to an activated side of the direction indicator as a second display image on the display device in cases in which the direction indicator has transitioned from an inactive state to an active state, the second predetermined area being wider than the first predetermined area and including the first predetermined area, and when switching between the first display image and the second display image, switches from one of the images to the other of the images in stages by scaling-down or scaling-up the one image".

According to the above configuration, when switching between the first display image and the second display image, the display controller switches from one of the images to the other of the images in stages by scaling-down or scaling-up the one image, such that the size of objects appearing in the images changes in stages as the images are switched over. The driver is able to visually track the level of change in the size of such objects, such that the driver is less liable to misjudge the distance to the objects than in cases in which the display is switched in a manner resulting in a sudden change in size. This enables the driver to intuitively ascertain the distance to objects in the vehicle surroundings when the images are switched. This enables the ease of the driving operation to be further improved.

Although exemplary embodiments of the present disclosure have been described above, the present disclosure is not limited thereto, and obviously various other modifications may be implemented within a range not departing from the spirit of the present disclosure.

What is claimed is:

1. A vehicle surroundings display device comprising:
   an imaging device that images a region toward a rear side of a vehicle and sideways from the vehicle;
   a display device that is capable of displaying an image captured by the imaging device; and
   a display controller that displays a first predetermined area of the image as a first display image on the display device in cases in which a direction indicator of the vehicle is in an inactive state, that displays a second predetermined area of the image corresponding to an activated side of the direction indicator as a second display image on the display device in cases in which the direction indicator has transitioned from an inactive state to an active state, the second predetermined area being wider than the first predetermined area and including the first predetermined area, and that switches a display on the display device from the second display image to the first display image after a predetermined standby duration has elapsed when the direction indicator has transitioned from an active state to an inactive state.

2. The vehicle surroundings display device of claim 1, wherein the display controller acquires vehicle speed information regarding the vehicle and modifies the predetermined standby duration according to the vehicle speed information.

3. The vehicle surroundings display device of claim 2, wherein the display controller modifies the predetermined standby duration so as to lengthen the predetermined standby duration in cases in which the acquired vehicle speed information corresponds to a predetermined vehicle speed or lower.

4. The vehicle surroundings display device of claim 2, wherein the display controller modifies the predetermined standby duration so as to shorten the predetermined standby duration in cases in which the acquired vehicle speed information corresponds to a predetermined vehicle speed or higher.

5. The vehicle surroundings display device of claim 1, wherein, when switching between the first display image and the second display image, the display controller switches from one of the images to another of the images in stages while scaling-down or scaling-up the one image.

6. The vehicle surroundings display device of claim 1, wherein the display controller acquires current location information relating to the vehicle and modifies the predetermined standby duration according to the current location information.

7. The vehicle surroundings display device of claim 1, wherein the display controller acquires object information regarding objects in the surroundings of the vehicle and modifies the predetermined standby duration according to the object information.

8. The vehicle surroundings display device of claim 1, wherein, within the second predetermined area, first predetermined area boundary lines are displayed at four corners of a boundary between the first predetermined area and another area.

* * * * *